US 6,703,095 B2

(12) United States Patent
Busshoff et al.

(10) Patent No.: US 6,703,095 B2
(45) Date of Patent: Mar. 9, 2004

(54) THIN-WALLED REINFORCED SLEEVE WITH INTEGRAL COMPRESSIBLE LAYER

(75) Inventors: Mario Busshoff, Ahaus (DE); Michael Kockentiedt, Legden (DE); Brett Tracy Scherrman, Huntersville, NC (US)

(73) Assignee: Day International, Inc., Dayton, OH (US)

( * ) Notice: Subject to any disclaimer, the term of this patent is extended or adjusted under 35 U.S.C. 154(b) by 0 days.

(21) Appl. No.: 10/078,829

(22) Filed: Feb. 19, 2002

(65) Prior Publication Data

US 2003/0157285 A1 Aug. 21, 2003

(51) Int. Cl.$^7$ .................. B29D 22/00; B29D 23/00; B32B 1/08; B41F 13/10; B41F 27/06
(52) U.S. Cl. ................ 428/36.91; 428/36.4; 428/304.4; 101/376; 101/375; 101/217
(58) Field of Search ................... 428/36.9, 36.91, 428/36.92, 245, 297, 304.4, 224, 36.4, 36.3; 101/217, 375, 376

(56) References Cited

U.S. PATENT DOCUMENTS

| | | |
|---|---|---|
| 4,391,898 A | 7/1983 | van der Velden |
| 4,503,769 A | 3/1985 | Andersen |
| 4,554,040 A | 11/1985 | van der Velden |
| 4,582,777 A | 4/1986 | Fischer et al. |
| 4,583,460 A * | 4/1986 | Maslin et al. ............ 101/375 |
| 4,601,928 A | 7/1986 | van der Velden |
| 4,656,942 A | 4/1987 | Vertegaal et al. |
| 4,684,600 A | 8/1987 | Worns et al. |
| 4,812,219 A | 3/1989 | Sattrup et al. |
| 4,949,445 A | 8/1990 | Van Der Meulen et al. |
| 4,963,404 A | 10/1990 | Jenkins |
| 5,429,048 A * | 7/1995 | Gaffney et al. ............ 101/217 |
| 5,468,568 A | 11/1995 | Kuhn et al. |
| 5,470,515 A | 11/1995 | Grimm et al. |
| 5,601,881 A | 2/1997 | Grimm et al. |
| 5,654,125 A | 8/1997 | Fan et al. |
| 5,700,343 A | 12/1997 | Castelli et al. |
| 5,797,322 A | 8/1998 | Lorig et al. |
| 5,819,657 A | 10/1998 | Rossini |
| 5,840,386 A | 11/1998 | Hatch et al. |
| 5,888,697 A | 3/1999 | Fan |
| 6,038,971 A | 3/2000 | Fischer |
| 6,038,975 A | 3/2000 | Hoffmann et al. |
| 6,224,526 B1 | 5/2001 | Stimmelmayr et al. |
| 6,276,271 B1 | 8/2001 | Busshoff |

FOREIGN PATENT DOCUMENTS

| | | | |
|---|---|---|---|
| GB | 1 327 758 | * 8/1973 | .......... B41F/29/02 |
| WO | PCT WO 01/29473 A1 | 4/2001 | |

OTHER PUBLICATIONS

Heckaman, Michael, Stork Cellramic, Inc., "Cylinder Sleeves for Flexography" articles from FLEXO magazine, Aug. and Sep., 1993, pags. 76–77, 96–97, 38–39 and 41.*
Heckaman, Michael, Stork Cellramic, Inc., "Cylinder Sleeves for Flexography" articles from FLEXO magazine, Aug. and Sep., 1993, pp. 76–77, 96–97, 38–39 and 41.
Laser Direct brochure.

* cited by examiner

Primary Examiner—Harold Pyon
Assistant Examiner—Michael C Miggins
(74) Attorney, Agent, or Firm—Dinsmore & Shohl LLP

(57) ABSTRACT

A sleeve for a print cylinder comprising a fiber reinforced, thin-walled material and having a seamless surface ready to be covered with a surface material. The sleeve may be used in flexographic printing, either as a support for photo-polymerized printing plates or rubber layers. The sleeve has the advantages of having low manufacturing cost and providing the necessary heat resistance to withstand rubber vulcanization temperatures. The sleeve is also airtight, and remains properly positioned during printing operations.

17 Claims, 4 Drawing Sheets

THIN-WALLED REINFORCED SLEEVE WITH INTEGRAL COMPRESSIBLE LAYER

BACKGROUND OF THE INVENTION

The present invention is directed to a hollow cylindrical sleeve which can be removably mounted onto mandrels, bridge sleeves, or cylinders for use in printing, coating, or the like, and in particular to a thin-walled hollow, reinforced cylindrical sleeve having an integral compressible layer.

In flexographic printing operations, flat, flexible plates were hand mounted onto print cylinders by wrapping and adhering the plates to the underlying cylinder. Generally, the flat plate comprised a base layer having either a rubber layer with relief indicia or a photocurable polymer layer thereon. In some instances, a compressible layer was positioned between the base layer and rubber or photocurable layer to improve print quality. Such flat plates had the advantage that they could be relatively thin and flexible because they were to be directly mounted to the print cylinder. However, such mounting processes were labor intensive and slow.

More recently, hollow cylindrical sleeves have served as supports for various types of printing. In one existing flexographic printing process and product (commercially available in the United States from OEC Graphics, Inc. under the trademark SEAMEX), a photopolymerizable material in the form of a flat sheet is wrapped around a metal (such as nickel) or plastic sleeve whose surface has been primed with a heat activated adhesive. The sleeve and photopolymer material are then heated, bonding the photopolymer to the sleeve. The surface of the sleeve is then ground to a predetermined plate thickness. The plate may then be processed by registering a negative onto the sleeve, exposing the sleeve to radiation to cure exposed areas of the photopolymer, and then washing out unexposed portions of the photopolymer to leave a relief image for printing.

In other printing applications, including offset lithography, a rubber layer is applied to a base sleeve and vulcanized. The rubber may then be ground to thickness. Accordingly, for these applications, it is necessary that the sleeve be able to tolerate the high temperatures experienced during activation of adhesive and vulcanization of rubber. In both of these applications, the hollow cylindrical sleeve must be relatively smooth and stiff in order to be suitable for its intended support purpose and to provide a desired printing quality upon a substrate such as, for example, paper.

Hollow cylindrical sleeves of various configurations are known from U.S. Pat. Nos. 4,391,898; 4,503,769; 4,554,040; 4,601,928; 4,656,942; 4,812,219; 4,949,445; 4,963,404; 5,468,568; 5,819,657; 5,840,386; 6,038,971; and 6,038,975. Generally, these prior art sleeves consist of a plurality of associated concentric layers, typically an outer printing or surface layer and one or more underlying support layers.

For example, Anderson, U.S. Pat. No. 4,503,769, discloses a metal-coated, thin-wall plastic printing cylinder for rotogravure printing. An expanding mandrel containing journal bearings internally and laterally supports a metal coated, hollow, plastic cylindrical sleeve (glass fiber reinforced polyester or phenolic resin).

Van der Meulen, U.S. Pat. No. 4,949,445, teaches a cylindrical sleeve with a metal or plastic core which is covered with a compressible material onto which a perforated (stencil) printing sleeve may be mounted. Van der Velden, U.S. Pat. Nos. 4,601,928, 4,554,040, and 4,391,898, teach cylindrical printing sleeves formed on about a woven fabric mesh using sheets of photopolymer which are wrapped about the mesh core.

Vertegaal et al, U.S. Pat. No. 4,656,942, discloses a printing apparatus using flexible metal sleeves to transfer ink and a method of mounting the sleeves. The sleeves are made by electro depositing metal in a form that is very thin, readily collapsible, and imperforate. The outer surface of the sleeve is coated with a flexible, microcrystalline, wholly inorganic photoconductive material. One example of this type of material is sputtered ultra-pure cadmium sulfide.

Sattrup et al., U.S. Pat. No. 4,812,219, discloses a method of producing a surface sleeve for mounting on a plate cylinder in a printing process. A cylindrical sleeve made from an electrically conductive material such as nickel is mounted onto a supporting mandrel with a cylindrical outer surface. An inner metal layer is electrolytically deposited on the outer peripheral surface of the sleeve and an outer copper layer is electrolytically deposited on the inner metal layer. The printing pattern is etched directly on the copper layer or on a chrome layer covering the copper layer. Subsequently, after the engraving of the printing pattern, the opposite outer portions of the sleeve are removed due to the increased thickness of the metal layers.

Jenkins, U.S. Pat. No. 4,963,404, discloses a process for the production of a thin walled coated cylinder and an ink transfer roller. A thin-walled, seamless nickel cylinder is coated by plasma spraying a ceramic fluorocarbon polymer thereon. An adhesive layer of metal is applied between the surface of the cylinder and the coating. The adhesive layer consists of at least two metals reacting exothermally with each other under plasma spraying conditions.

Kühn et al, U.S. Pat. No. 5,468,568, is directed to a printing roller designed for a gravure printing process with a sleeve of fiber-reinforced thermoplastic which is then plasma sprayed to form a coating of copper or a copper alloy. A variety of fibers and plastics are disclosed for use in the sleeve, which is stated to have a wall thickness of less than about 3 mm.

Rossini, U.S. Pat. No. 5,819,657, teaches a carrier spacer sleeve for a printing cylinder. The patent contains a discussion of the use of thin sleeves in flexographic printing operations. Such thin sleeves are designed to be air mounted onto the carrier spacer sleeves to enable a printer to modify the effective diameter of printing cylinders for jobs of different print repeat lengths.

Hatch et al, U.S. Pat. No. 5,840,386, describes a sleeve that is adapted to be mounted onto a mandrel. The sleeve is used to transfer ink in anilox or gravure printing processes. The sleeve includes an inner layer, an intermediate compressible layer, and a metal outer layer. The inner layer may be fabricated from fiber-reinforced plastic and may be in the form of a DuPont Cyrel™ sleeve.

Fisher, U.S. Pat. No. 6,038,971 discloses a method and apparatus for producing a screen-printing stencil. A covering layer is applied to certain areas of a fine-mesh screen corresponding to a predetermined printing design. The screen is closed on the backside by a cylindrical support to prevent the covering liquid from passing through the screen. The support may be a thin walled metal cylindrical sleeve.

Hoffmann et al, U.S. Pat. No. 6,038,975, discloses a gapless sleeve for offset printing. The sleeve includes a roller core and a thin intermediate layer, which can be either a self-adhesive plastic sheet or a coating of plastic, metallic, or ceramic material.

The known hollow cylindrical sleeves however exhibit a number of constraints with respect to their manufacture and use. For example, one problem has been that one currently-used manufacturing process for such hollow cylindrical sleeves produces a seam in the sleeve which may affect the print quality of high quality flexographic printing. Other substrates such as nickel, zinc, copper, or other metal sleeves are much higher in cost and cannot effectively serve as consumable items. Another problem is that current polyester sleeve materials are not able to withstand the high temperatures required to vulcanize rubber print layers.

None of the thin-walled hollow cylindrical sleeve constructions of the prior art solely utilizes a reinforcing fibrous material to provide a low-cost product which is capable of withstanding the heat of vulcanization of rubber and which has the capability of being mounted onto a carrier in an airtight manner. Conventional hollow cylindrical sleeves having a base layer of fabric have seen only limited use due to their lack of holding strength on a cylinder as well as their lack of air-tightness required for proper mounting of the sleeve. A thin-walled fiber-reinforced hollow cylindrical sleeve would be advantageous because of low manufacturing costs and could be used as a consumable item when paired with either a photopolymer plate or a rubber layer.

Therefore, there remains a need in the art for an inexpensive, thin-walled fiber-reinforced hollow cylindrical sleeve which does not suffer from the problems of prior art sleeves.

SUMMARY OF THE INVENTION

The present invention is directed to fiber reinforced, thin-walled hollow cylindrical sleeves used in flexographic printing as supports for imageable surface layers such as photo-polymerizable printing plates or rubber layers. By "imageable surface layer" we mean material which can be acted upon (such, for example, as by actinic radiation to cure, or by mechanical grinding, or by laser ablation) to form an imaged relief surface. The hollow cylindrical sleeve has the advantages of having a low manufacturing cost, rigidity, and provides the necessary heat resistance to withstand rubber vulcanization temperatures. The hollow cylindrical sleeve is also airtight, and remains properly positioned during printing operations. The hollow cylindrical sleeve can also be used in applications that include plate-on-sleeve systems.

In accordance to one aspect of the present invention, a thin-walled print sleeve is provided and includes a hollow cylindrical base comprising a fiber-reinforced polymer resin having a wall thickness of from between about 0.1 mm to about 0.8 mm, preferably from about 0.2 mm to about 0.7 mm, a compressible layer on the cylindrical base, and a layer of material having an imageable surface on the compressible layer. The cylindrical base is expandable under the application of fluid pressure and provides a fluid-tight seal when said sleeve is mounted onto a cylinder, mandrel, or the like. In a preferred embodiment, the material having an imageable surface is selected from the group consisting of photocurable (e.g., photopolymerizable) materials and natural or synthetic rubbers. Preferably, the imageable material has a thickness of from between about 0.5 mm to about 1.4 mm.

It is preferred that the fiber is selected from the group consisting of glass fibers, aramid fibers, carbon fibers, metal fibers, and ceramic fibers. Preferred polymer resins for use in the fabrication of the sleeve include phenolic resins and aromatic amine-cured epoxy resins. The compressible layer improves print quality and preferably has a thickness of from between about 0.5 mm to about 1.4 mm. The print sleeve typically has an overall thickness of from between about 3.0 mm to about 3.5 mm. Generally, the sleeve is expandable under a fluid pressure of from between about 70 to about 112 psi (4.9 to about 7.9 kg/cm). The sleeve may be designed to be mounted onto a print cylinder, a mandrel, or a bridge mandrel, depending upon the desired use.

In accordance with another aspect of the present invention, a method of fabricating a thin-walled print sleeve is provided and includes providing a cylindrical support, applying a fibrous material and a polymer resin to the support to form a thin-walled fiber-reinforced resin base sleeve, curing the base sleeve, and working an outer surface of the base sleeve to provide a wall thickness of from between about 0.1 mm to about 0.8 mm. A layer of compressible material is applied to the outer surface of the base sleeve, and a layer of material having an imageable surface is applied over the compressible material to form the print sleeve. The print sleeve is cured, and an outer surface of the print sleeve is worked (such as by mechanical grinding) to provide a predetermined overall wall thickness.

Preferably, the fibrous material comprises a fiber strand which is wound onto said support. Alternatively, the fibrous material may comprise a woven fabric. The fibrous material and polymer resin may be applied to the support in a variety of ways. For example, polymer resin may be coated onto the support and the fibrous material wound or wrapped about the polymer resin. Alternatively, the fibrous strand or woven fabric may be impregnated with polymer resin and applied to the support. The application of fibrous material and resin may be repeated to build up a sufficient wall thickness for the base sleeve. Once the base sleeve reaches a predetermined thickness, the outer surface of the base sleeve is worked, such as by mechanically grinding it, to achieve desired tolerances. Alternatively, the base sleeve may be fabricated by a pultrusion process in which the support comprises a forming die.

The compressible layer may also take a number of forms. For example, in one embodiment of the invention, the compressible layer comprises a sheet material that is applied to the base sleeve by spirally wrapping the compressible layer around the base sleeve. Alternatively, the compressible layer is applied to the base sleeve by wrapping and seaming opposite ends of the compressible layer. The compressible layer may include a layer of adhesive on at least the surface in contact with the base sleeve to secure the two together.

In another embodiment of the invention, the compressible layer comprises an uncured elastomer, preferably containing uniformly distributed microspheres, and the elastomer is spread onto the surface of the base sleeve and then cured and ground to a predetermined thickness and diameter. The elastomer, in the form of a liquid, may be applied to the base sleeve while the base sleeve is rotating. Preferably, the elastomer is a foamable composition which is foamed and cured in place on the base sleeve without the need for additional adhesives to secure the compressible layer to the base sleeve. While the application and curing may take place without the need for a mold, it is within the scope of the invention to use a mold to shape the compressible layer.

The outer layer of the sleeve comprises a material having an imageable surface. In one embodiment of the invention, the material comprises a photocurable material in the form of a sheet. The sheet of photocurable material is applied to the compressible layer by spirally wrapping the sheet around the layer of compressible material, or, alternatively, by wrapping and seaming opposite ends of the sheet. In yet other alternative embodiments, the photocurable material may be applied to the compressible layer by spreading, dipping, casting, or molding the photocurable material on the layer of compressible material. As with the compressible layer, the outer layer may be applied as a liquid while the underlying sleeve and compressible layer are rotating. Again, when such a rotary casting method is used, there is no need for any additional adhesives to secure the compressible and outer layers to one another.

In another embodiment of the invention, the material having an imageable surface comprises uncured natural or synthetic rubber in the form of a sheet. The rubber layer is applied to the compressible layer by spirally wrapping the sheet around the layer of compressible material or by wrapping and seaming opposite ends of the sheet. Alternatively, the material having an imageable surface may comprise uncured natural or synthetic rubber in the form of an extruded tube which is mounted over the compressible layer by expanding the extruded tube under fluid pressure and pulling the tube onto the base sleeve and compressible layer. In yet another embodiment, the material having an imageable surface comprises uncured natural or synthetic rubber which is spread or cast over said compressible layer. The entire sleeve is then cured.

Accordingly, it is a feature of the present invention to provide a reinforced, thin-walled sleeve for use in printing operations having a low manufacturing cost, rigidity, and the necessary heat resistance to withstand rubber vulcanization temperatures. The hollow cylindrical sleeve is also airtight, and remains properly positioned during printing operations. These, and other features and advantages of the present invention, will become apparent from the following detailed description, the accompanying drawings, and the appended claims.

BRIEF DESCRIPTION OF THE DRAWINGS

The following detailed description of the embodiments of the present invention can be best understood when read in conjunction with the following drawings, where like elements are indicated with like reference numerals and in which.

DETAILED DESCRIPTION OF PREFERRED EMBODIMENTS

Figure 1:
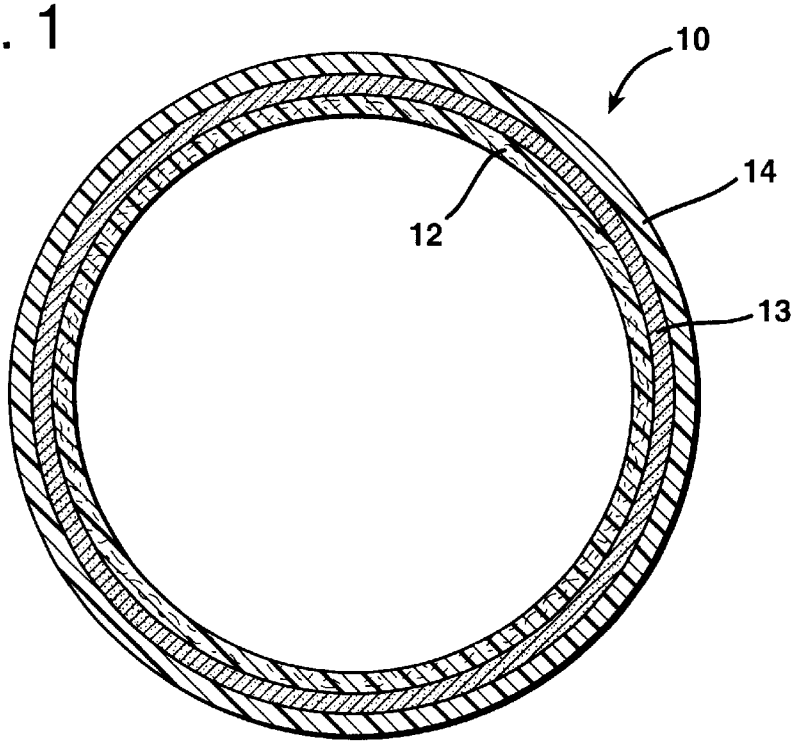
FIG. 1 illustrates a view in cross section of one embodiment of the hollow cylindrical sleeve of the present invention.

One embodiment of a fiber reinforced, thin-walled hollow cylindrical sleeve 10 of the present invention is illustrated in FIG. 1. The base sleeve 12 is fabricated from a polymer resin reinforced with a fibrous material, thereby enabling the sleeve 10 to have a seamless surface that is adapted to be covered with a layer of compressible material 13 and an imageable material 14 such as rubber, polymer, photopolymer, or any other material that can be imaged and used in a printing process. The fibrous material may contain glass fibers, aramid fibers, carbon fibers, metal fibers, ceramic fibers, or any other synthetic endless or long fibers that increases the stability, stiffness, and rigidity of sleeve 10 such that it may accommodate conditions found in conventional graphic arts environments.

In a preferred embodiment, the fibrous material is fiberglass. In alternative embodiments, aramid fiber or any desired combination of fibrous materials within the base sleeve 12 are also within the scope of the invention. Additionally, the fibrous material may be woven or nonwoven. The fibrous material content in the base sleeve is preferably from about 30 to about 65% by weight, most preferably about 50% by weight. Commercially available fibers having desired diameters and lengths may be used.

Preferred polymer resins are those which are capable of withstanding rubber vulcanization temperatures of up to about 160° C. without softening or degrading. Suitable polymer resins include unsaturated polyester resins such as, for example, Synolite (trademark) and Atlac (trademark) resins commercially available from DSM Composite Resins, Zwolle, Netherlands, phenolic resins, and aromatic amine-cured epoxy resins. Preferably, the base sleeve 12 has a wall thickness of from between about 0.1 mm to about 0.8 mm, more preferably between about 0.4 mm to about 0.7 mm, and most preferably about 0.68 mm.

Compressible layer 13 is applied over base sleeve 12 as shown in FIG. 1. Preferably, compressible layer 13 has a thickness of from between about 0.5 mm to about 1.4 mm. The compressible layer may take a number of forms. For example, in one embodiment, compressible later 13 is provided as a sheet material that is applied over base 12 by spirally wrapping it around the sleeve. Alternatively, compressible layer 13 may be wrapped around the base sleeve and opposite ends of the sheet seamed. Adhesive may be applied to the surface of base sleeve 12 or to one or both surfaces of the compressible layer to secure the compressible layer to base sleeve 12 and to secure imageable layer 14 to compressible layer 13.

Alternatively, compressible layer 13 may be formed by uniformly mixing hollow microspheres with an uncured rubber and solvent and applying the mixture over base sleeve 12. Further details of the composition of the compressible layer may be found in Gaworoski et al, U.S. Pat. No. 4,770,928, the disclosure of which is incorporated herein by reference. The rubber/microsphere mixture may be spread onto base sleeve 12 using a knife or blade to provide a uniform thickness. Alternatively, the mixture may comprise polyurethane precursors (such as polyols and isocyanates) and be applied as a liquid while the underlying base 12 is rotating. In this embodiment, there is no need for a mold, although a molding or shaping step may optionally be utilized. The shape and dimensions of the compressible layer may be controlled by controlling the selection of the reactants, temperatures, and degree of crosslinking and by applying appropriate volumetric amounts of the materials to the underlying base sleeve. The compressible layer may then be cured or partially cured in place. Where a rotary casting method is utilized, there is no need for the use of additional adhesives to secure the compressible layer 13 to base 12.

As shown in FIG. 1, imageable layer 14 may be applied and cured in place on compressible layer 13 to form an integral print sleeve. In this embodiment, an uncured polymer in liquid form is applied to compressible layer 13 while the sleeve is rotating. Again, desired dimensional thicknesses may be achieved by appropriate selection of reactants, temperatures, and degree of crosslinking and by applying appropriate volumetric amounts of the materials. No additional adhesives are needed to secure imageable layer 14 to compressible layer 13.

Figure 2:
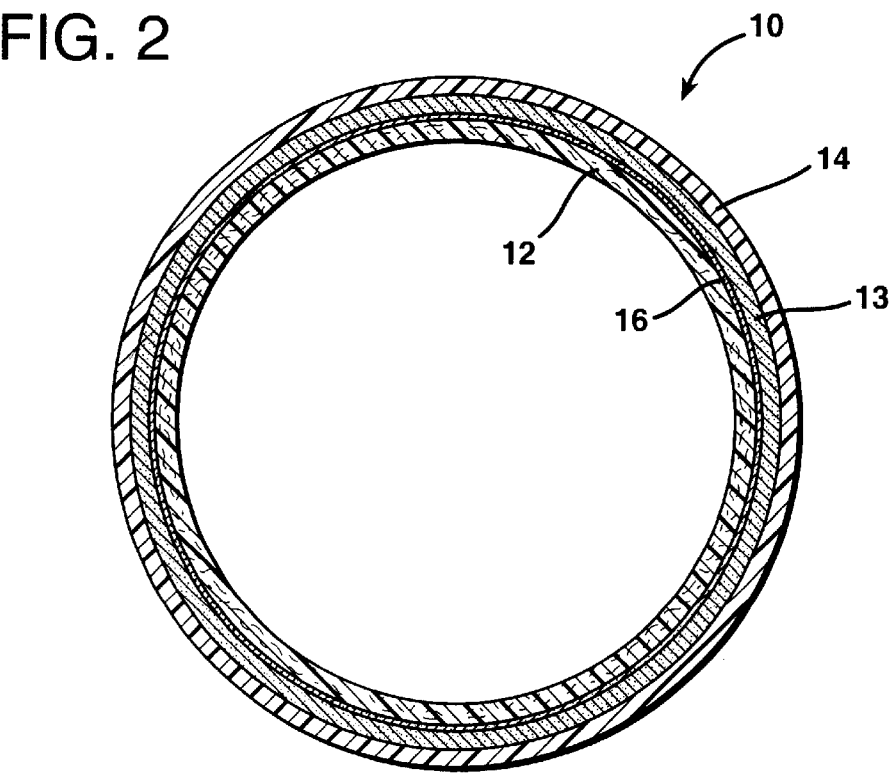
FIG. 2 illustrates a view in cross section of another embodiment of the hollow cylindrical sleeve of the present invention.

FIG. 2 illustrates another embodiment of the invention in which imageable layer 14 is secured to compressible layer 13 via adhesive 16. Adhesive 16 may be in the form of a thin film or tape having a thickness of between about 0.05 mm to about 1.5 mm, and may be either pressure sensitive or be activated by heat. Again, adhesive 16 is not required where imageable layer 14 has been formed by a casting method and cured in place.

Other methods may be used to fabricate base sleeve 12. The fibrous material and polymer resin may be applied to the support in a variety of ways. For example, polymer resin may be coated onto the support and the fibrous material wound or wrapped about the polymer resin. Alternatively, the fibrous strand or woven fabric may be impregnated with polymer resin and applied to the support. The application of fibrous material and resin may be repeated to build up a sufficient wall thickness for the base sleeve. The fibrous material may be in the form of a woven mat which is spirally wrapped about the support or wrapped and then seamed.

Alternatively, base sleeve 12 may be manufactured by a pultrusion process. Conventional pultrusion processes involve drawing a bundle of reinforcing material (e.g., glass filaments or fibers) from a source. As the fibers are drawn from the source, the fibers are wetted and the fiber bundle impregnated (preferably with a thermosettable polymer resin) by passing the reinforcing material through a resin bath in an open tank. The resin-wetted and impregnated bundle is then pulled through a shaping die to align the fiber bundle and to manipulate it into the proper cross-sectional configuration. Next, the resin is cured in a mold while maintaining tension on the filaments. Because the fibers progress completely through the pultrusion process without being cut or chopped, the resulting products generally have exceptionally high tensile strength in the longitudinal (i. e., in the direction the filaments are pulled) direction. Exemplary pultrusion techniques are described in U.S. Pat. No. 3,793,108 to Goldsworthy; U.S. Pat. No. 4,394,338 to Fuway; U.S. Pat. No. 4,445,957 to Harvey; and U.S. Pat. No. 5,174,844 to Tong.

Imageable layer 14 is formed from a material which can be imaged, either mechanically, optically, or chemically. For example, in one embodiment of the invention, imageable layer 14 comprises a photocurable material. A number of photopolymeric materials are commercially available such as, for example, Cyrel (trademark) commercially available from DuPont and FAH II (trademark), commercially available from BASF. The photocurable material may be in the form of a sheet which may be applied to the base sleeve by spirally wrapping the sheet about the base sleeve. Alternatively, the sheet may be wrapped and seamed. In other alternative embodiments, the photocurable material may be applied to the base sleeve as a liquid by spreading, dipping, casting (including rotary casting), or molding the liquid photocurable material on the base sleeve.

Imageable layer 14, in another embodiment of the invention, may be formed from a natural or synthetic rubber including elastomers such as polyurethanes and silicones. In one embodiment, uncured rubber, in the form of a sheet, may be applied to the base sleeve by spirally wrapping the sheet about the base sleeve. Alternatively, the sheet may be wrapped around the base sleeve, and opposite ends of the sheet seamed together. In an alternative embodiment, the imageable layer may be in the form of an extruded tube which is then mounted over the base sleeve. In still another alternative embodiment, the imageable layer may be applied by spreading uncured rubber onto the base sleeve.

Figure 3:
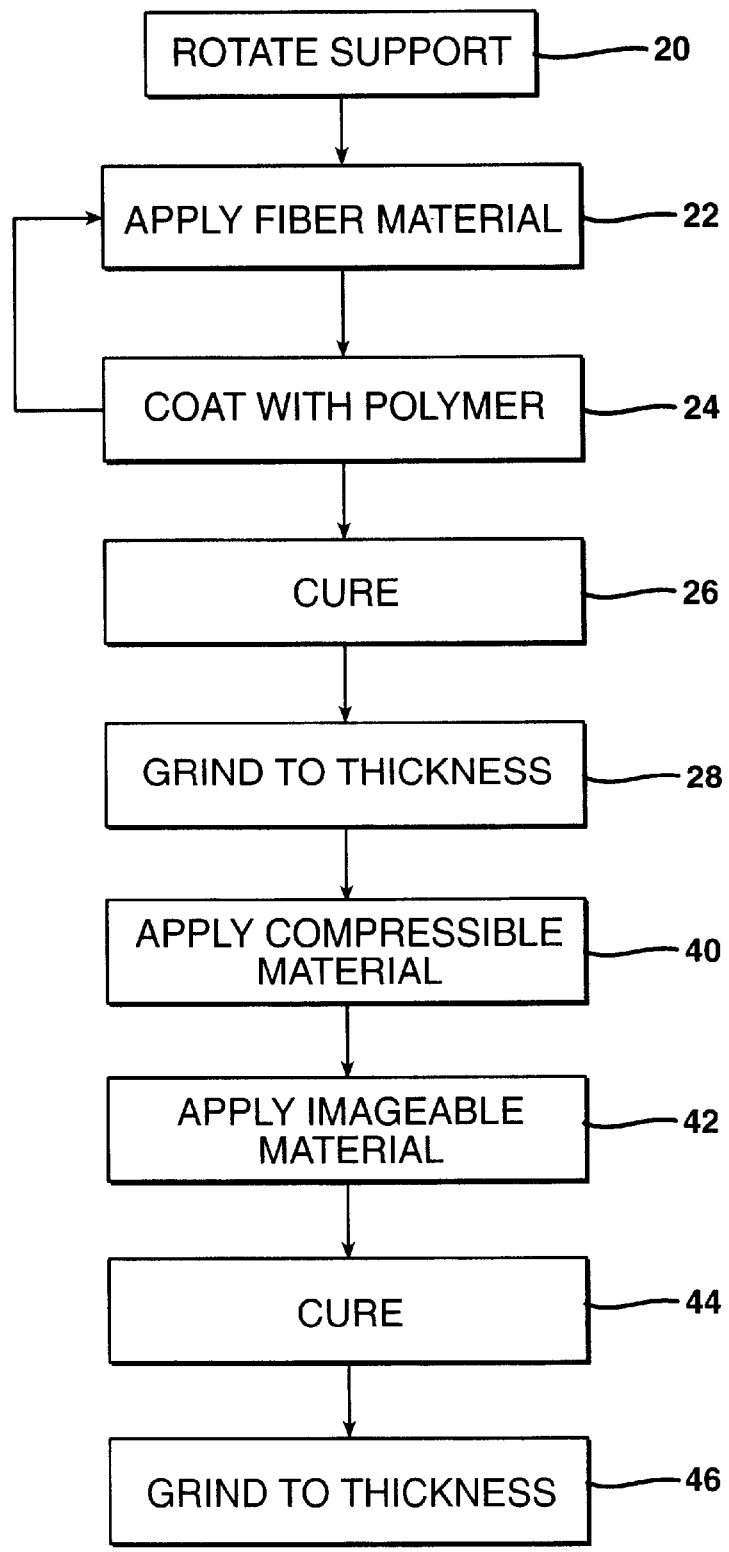
FIG. 3 shows a flow chart depicting process steps for fabricating a hollow cylindrical sleeve in accordance with one embodiment of the present invention.

The flow chart of FIG. 3 depicts a general representation of process steps used to produce print sleeve 10 in accordance with one embodiment of the present invention. In step 20, a cylindrical support, which can be comprised of metal, is provided. The support may be rotated to facilitate application of the fibrous material. In step 22, one or more layers of the fibrous material are applied and wound on the rotating support. The fibrous layer is then coated in step 24 with the polymer resin. The fibrous material may comprise a single fiber or a group of fibers formed into a strand or thread. The winding angle of the fibrous material is variably adjustable in a range from 0° to 90° in the hoop and axial directions. The deposit speeds of the fibrous material and the tension applied to the fibers are both adjustable within broad ranges as is known in this art. Steps 22 and 24 are repeated until a resulting hollow core base sleeve 12 is produced having the desired wall thickness.

In step 26, base sleeve 12 is cured using heat and/or actinic radiation. Alternatively, base sleeve 12 simply may be formed, and the curing step postponed until the entire sleeve has been assembled. In step 28, the outer surface of base sleeve 12 is worked, typically mechanically worked by grinding, skiving, or machining to produce a sleeve having high precision with respect to its wall thickness and outer diameter.

Compressible material is applied to the base sleeve in step 40. Again, the compressible layer may be in the form of a sheet material which is wrapped around sleeve 12, or the compressible material may be applied in uncured form to a desired thickness and then cured or partially cured in place. In step 42 imageable material is applied over the compressible material. Again, the imageable material may be in the form of a sheet, or may be applied as a viscous liquid. The entire sleeve assembly is then cured. If the imageable material is natural or synthetic rubber, the sleeve may be subjected to cure temperatures of up to about 160° C. In step 46, the cured sleeve is worked, typically ground, to provide a final desired wall thickness for the imageable material and an overall diameter for the sleeve.

For example, it is possible to produce a base sleeve 12 having a length of up to 1 meter or more and with an outer diameter of up to 100 mm or more, and a wall thickness of between about 0.1 mm to about 0.8 mm, preferably from about 0.2 mm to about 0.7 mm, with an outside diameter tolerance of no greater than 0.0254 mm (0.001 inch). Additionally, it is possible to produce base sleeve 12 having a Total Indicated Runout (TIR) no greater than 0.0254 mm (0.001 inch), thereby ensuring good printing quality for the sleeve.

It should be apparent to those skilled in the art that a further advantage of the print sleeve 10 in accordance with the present invention is a lower material cost than nickel or other metal-based sleeves. The print sleeve, because of its low cost, may be used as a consumable item. Another advantage includes providing print sleeve 10 with the necessary heat resistance to withstand vulcanization temperatures up to about 160° C. that are used in conventional rubber curing applications. Moreover, due to the seamless surface of the sleeve, print sleeve 10 has no negative effects on the resulting print quality, as do some prior art print sleeves.

Figure 4:
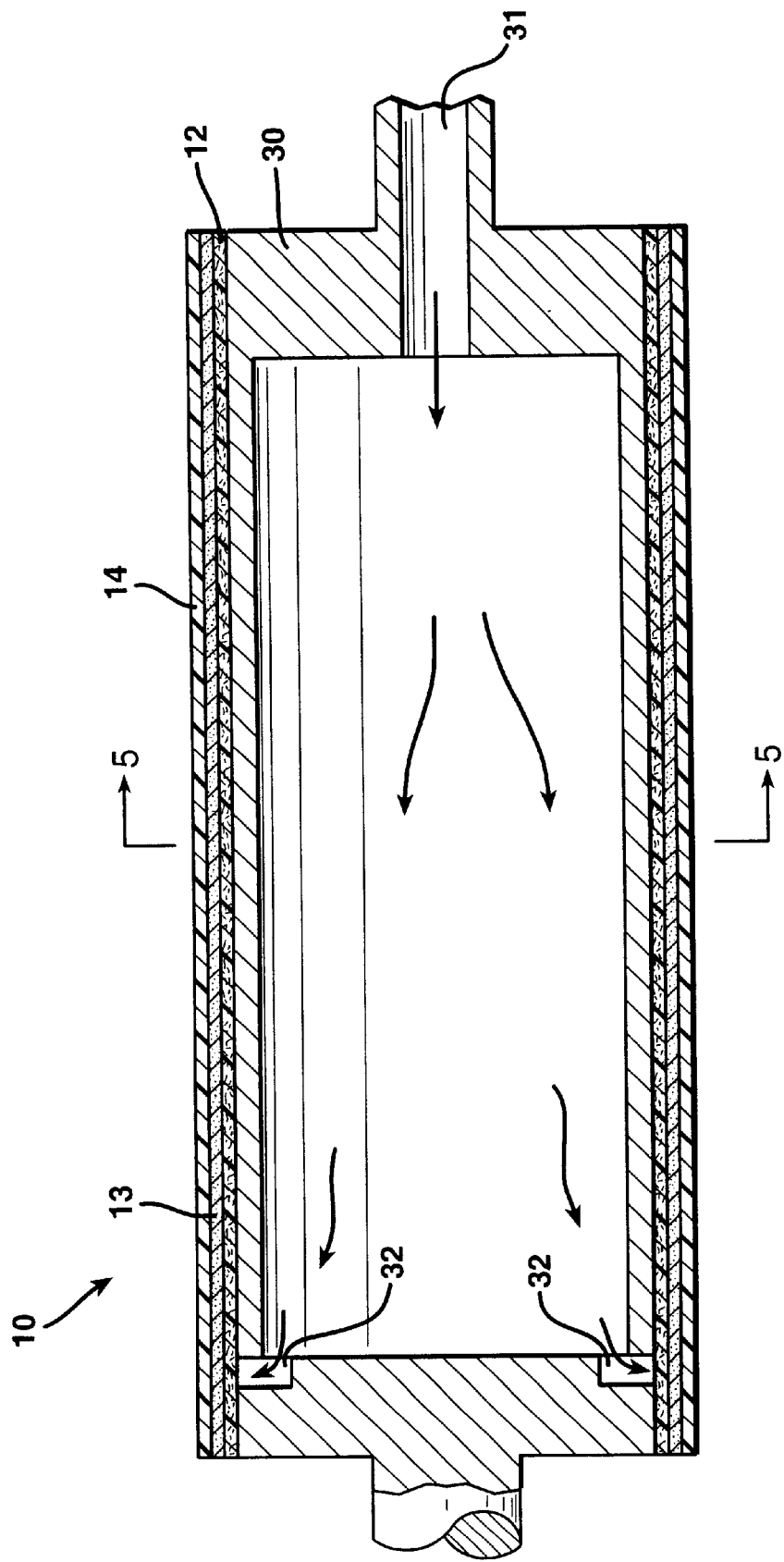
FIG. 4 illustrates a partial longitudinal sectional view of a mandrel supporting one embodiment of the hollow cylindrical sleeve of the present invention.

As the cylindrical wall of print sleeve 10 is airtight, and is capable of some slight expansion upon the application of fluid pressure, in a preferred embodiment, the sleeve may be mounted to a plate cylinder 30 as illustrated in FIG. 4. Plate cylinder 30 may be of any conventional construction. In the embodiment illustrated, cylinder 30 is provided with an air inlet 31 which supplies air under pressure into the interior of the plate cylinder from a source (not shown). A plurality of air passageways 32 provide a path to the exterior surface of plate cylinder 30. Pressurized air flows through passageways 36 and acts to expand sleeve 10 slightly, enough to permit sleeve 10 to slide easily along the length of cylinder 30 until it is completely mounted. Once the air pressure is removed, sleeve 10 contracts to form a tight friction fit with plate cylinder 30.

Applying the supply of pressured fluid again, permits sleeve 10 to be completely removed from cylinder 30. The preferred pressure of the pressurized fluid (typically air) is from about 70 to about 112 psi (about 4.9226 to about 7.8762 kg/cm). The sleeve 10 may be mounted onto a flexographic or rotogravure plate cylinder and is provided with a desired length such that a proper fit is provided on the plate cylinder. Alternatively, sleeve 10 may be mounted onto a mandrel or bridge mandrel which is in turn mounted onto a plate cylinder. A suitable bridge mandrel is taught in commonly-assigned Busshoff, U.S. Pat. No. 6,276,271, the disclosure of which is incorporated by reference herein.

Figure 5:
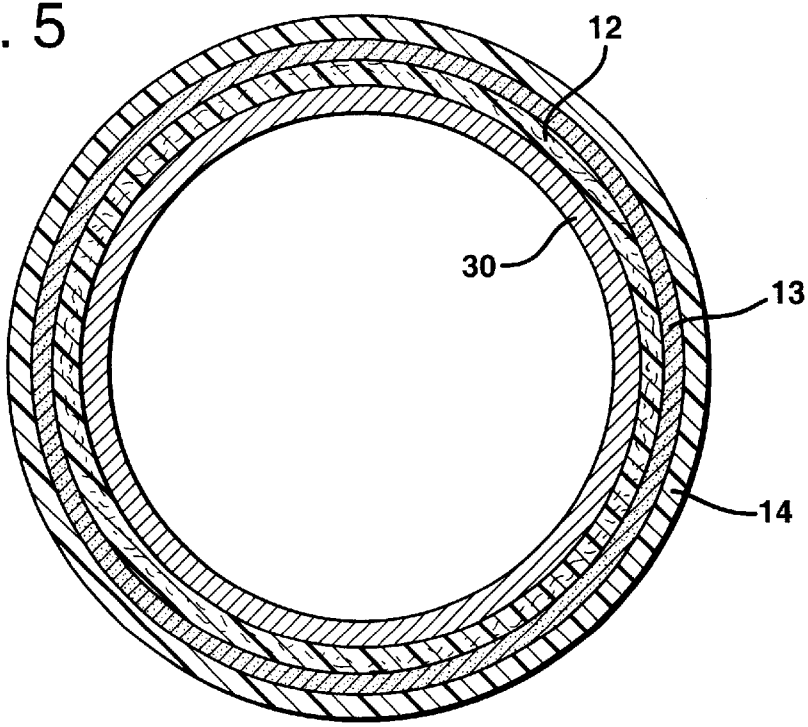
FIG. 5 is a cross-sectional view taken along line 5—5 in FIG. 4.
Figure 6:
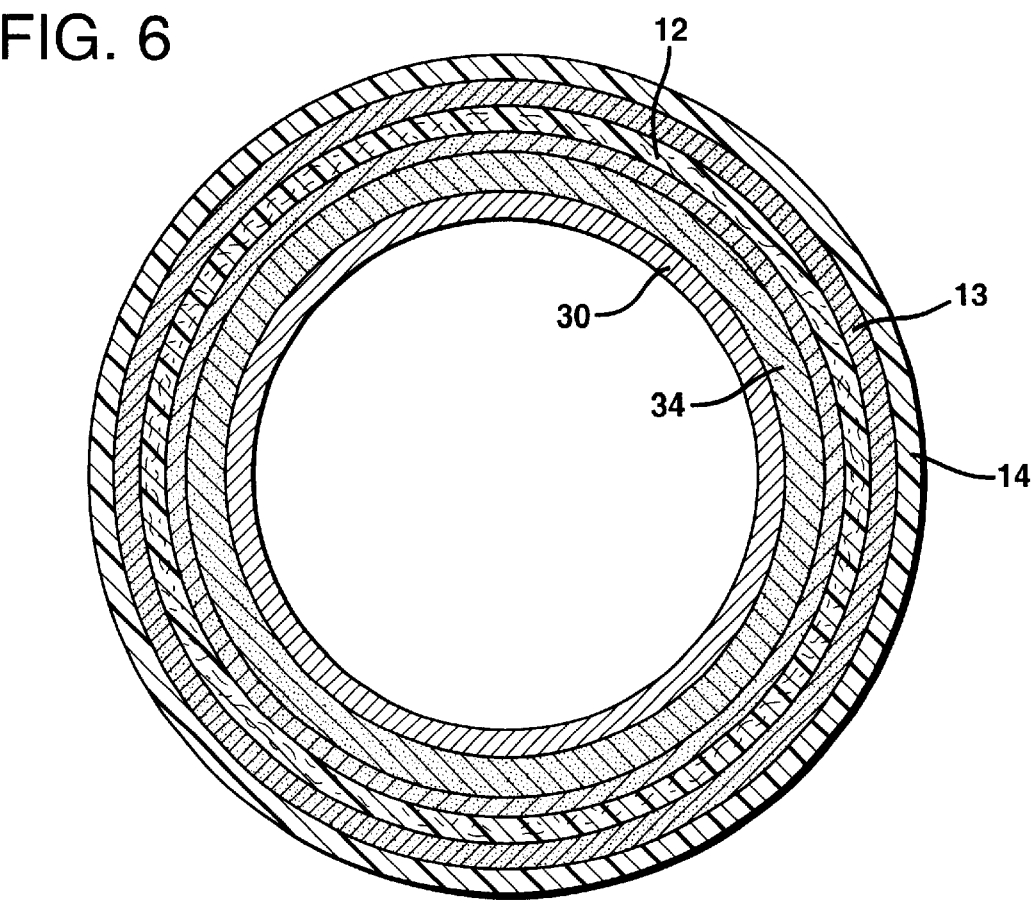
FIG. 6 is a cross-sectional view of another embodiment of the invention.

FIGS. 5 and 6 illustrate embodiments of the invention in which sleeve 10 may be used in a printing operation. In particular, FIG. 5 depicts a first embodiment in which sleeve 10 comprises three components only, base sleeve 12, compressible layer 13, and imageable layer 14. FIG. 6 depicts another embodiment in which plate cylinder 30 includes a compressible layer 34 thereon. Compressible layer 34 may comprise a polymeric foam material and, in certain instances, acts to cushion sleeve 10 to provide improved print quality.

In one application, sleeve 10 may be covered with natural or synthetic rubber as the imageable layer 14 and then vulcanized by conventional means to produce a rubber-coated liquid transfer device. The outer surface of imageable layer may then be laser engraved or otherwise machined as is known in the graphic arts to provide a raised relief surface or depressions for flexographic or gravure printing. For example, a typical plate-on-sleeve configuration will be a hollow, cylindrical fiberglass composite having a wall thickness of about 0.68 mm, a compressible layer having a thickness of about 1.3 mm, and a rubber plate having a thickness of from about 1.1 to about 1.7 mm mounted thereon using a thin (about 0.1 mm) adhesive tape or film.

In another application, sleeve 10 may be covered with a photopolymer and then exposed through a negative using actinic radiation. The exposed areas are cured, and the unexposed areas are then removed to produce a photopolymer printing plate. For example, a continuous photopolymer sleeve will have a typical configuration of a hollow, cylindrical fiberglass composite having a wall thickness of about 0.68 mm, a compressible layer having a thickness of from about 1.2 to about 1.3 mm, and a photopolymer plate thereon having a thickness of about 1.25 mm.

The invention having being described with reference to preferred embodiments, it will be apparent that the same may be varied in many ways. For example, although the sleeve has been described and shown therein used as liquid transfer rolls, the sleeve may be provided with a dielectric coating, such as alumina, and used in corona discharge systems. The sleeve also can be provided with ceramic or metallic coatings and used as a transporter roll for paper, film, textiles etc. Such variations are not to be regarded as a departure from the spirit and scope of the invention, and all such modifications as would be obvious to one skilled in the art were intended to be included within the scope of the following claims.

What is claimed is:

1. A thin-walled, flexographic, airtight print sleeve comprising:

a hollow cylindrical base comprising a fiber-reinforced polymer resin having a wall thickness of from between about 0.1 mm to about 0.8 mm;

a compressible layer which is disposed on said cylindrical base; and a layer of material which forms an imaged relief surface disposed on said compressible layer, said cylindrical base is expandable under fluid pressure and provides a fluid-tight seal when said sleeve is mounted.

2. A sleeve as claimed in claim 1 in which said material having an imageable surface is selected from the group consisting of a photocurable material and natural or synthetic rubber.

3. A sleeve as claimed in claim 1 where the fiber is selected from the group consisting of glass fibers, aramid fibers, carbon fibers, metal fibers, and ceramic fibers.

4. A sleeve as claimed in claim 1 where said polymer resin is selected from the group consisting of unsaturated polyester resins, phenolic resins and aromatic amine-cured epoxy resins.

5. A sleeve as claimed in claim 1, where said cylindrical base has a wall thickness of from between about 0.2 mm to about 0.7 mm.

6. A sleeve as claimed in claim 1 where said compressible layer has a thickness of from between about 0.5 mm to about 1.4 mm.

7. A sleeve as claimed in claim 1 where said layer of material having an imageable surface has a thickness of from between about 0.8 mm to about 1.4 mm.

8. A sleeve as claimed in claim 1 where said sleeve has a thickness of from between about 3.0 mm to about 3.5 mm.

9. A sleeve as claimed in claim 1 where said sleeve is expandable under a fluid pressure of from between about 70 to about 112 psi (4.9 to about 7.9 kg/cm).

10. A sleeve as claimed in claim 1 in which said material which forms an imaged relief surface comprises a polyurethane or a silicone rubber.

11. A sleeve as claimed in claim 1 in which said fiber-reinforced polymer resin is comprised of a single wound filament.

12. A sleeve as claimed in claim 1 in which said material which forms an imageable surface comprises a photocurable material.

13. A sleeve as claimed in claim 12 in which said photocurable material is spirally wrapped about said base.

14. In combination, a thin-walled, flexographic, airtight print sleeve having a hollow cylindrical base comprising a fiber-reinforced polymer resin with a wall thickness of from between about 0.1 mm to about 0.8 mm, a compressible layer disposed on said cylindrical base, and a layer of a material which forms and imaged relief surface disposed on said compressible layer, said print sleeve mounted on a support selected from the group consisting of a print cylinder, a mandrel, and a bridge mandrel wherein a seal is formed between the cylindrical base and the support which is fluid-tight.

15. A thin-walled, flexographic, airtight print sleeve comprising:
- a hollow cylindrical base comprising a fiber-reinforced polymer resin having a wall thickness of from between about 0.1 mm to about 0.8 mm;
- a compressible layer disposed on said cylindrical base; and
- a layer of material having a raised relief surface comprising an image which is disposed on said compressible layer, said cylindrical base is expandable under fluid pressure and provides a fluid-tight seal when said sleeve is mounted.

16. A sleeve as claimed in claim 15 in which said layer of material having a raised relief surface comprises a photo-cured polymer.

17. A sleeve as claimed in claim 15 in which said layer of material having a raised relief surface comprises a polyurethane on a silicone rubber.

* * * * *

UNITED STATES PATENT AND TRADEMARK OFFICE
CERTIFICATE OF CORRECTION

PATENT NO. : 6,703,095 B2
DATED : March 9, 2004
INVENTOR(S) : Busshoff et al.

It is certified that error appears in the above-identified patent and that said Letters Patent is hereby corrected as shown below:

Column 12,
Line 8, "on a silicone" should read -- or a silicone --.

Signed and Sealed this

Seventh Day of September, 2004

JON W. DUDAS
*Director of the United States Patent and Trademark Office*